Figure 1:
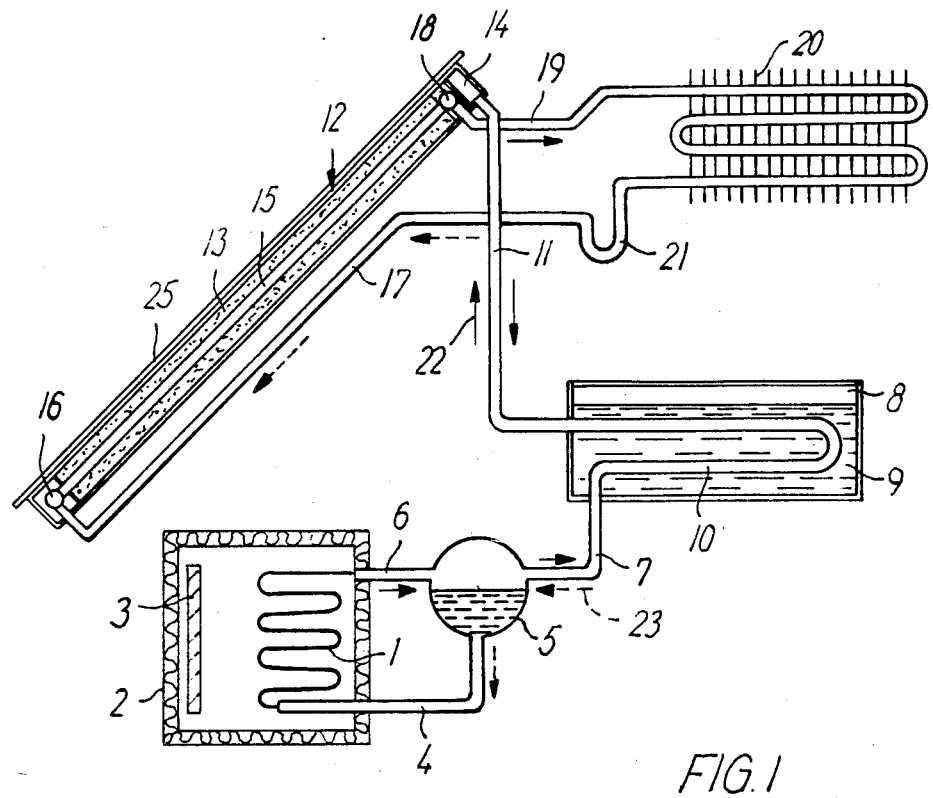

United States Patent [19]

Friberg et al.

[11] Patent Number: 4,586,345
[45] Date of Patent: May 6, 1986

[54] SOLAR ENERGY POWERED SYSTEM FOR THE PRODUCTION OF COLD

[75] Inventors: Svend Friberg, Herlev; Peter Korsgaard, Copenhagen; Peder Worsøe-Schmidt, Lyngby, all of Denmark

[73] Assignee: Kaptan APS, Herlev, Denmark

[21] Appl. No.: 695,369

[22] PCT Filed: May 17, 1984

[86] PCT No.: PCT/DK84/00040
§ 371 Date: Jan. 11, 1985
§ 102(e) Date: Jan. 11, 1985

[87] PCT Pub. No.: WO84/04581
PCT Pub. Date: Nov. 22, 1984

[30] Foreign Application Priority Data

May 18, 1983 [DK] Denmark ............ PCT/DK83/00055

[51] Int. Cl.[4] .............................................. F25B 27/00
[52] U.S. Cl. ..................... 62/235.1; 62/477; 62/238.3
[58] Field of Search ............ 62/235.1, 476, 477, 62/238.3

[56] References Cited

U.S. PATENT DOCUMENTS

| | | | |
|---|---|---|---|
| 4,034,569 | 7/1977 | Tchernev | 62/235.1 |
| 4,184,338 | 1/1980 | Bennett | 62/235.1 |
| 4,207,744 | 6/1980 | Takeshita et al. | 62/235.1 |

Primary Examiner—Henry Bennett
Attorney, Agent, or Firm—Bernard, Rothwell & Brown

[57] ABSTRACT

In a system for the production of cold comprising an absorption cooling system with an evaporator (1) from which coolant is supplied in the vapor state through an absorber (12) to a condenser (8), from which coolant is supplied in the liquid state to a coolant vessel (5) connected with the evaporator (1) the absorption cooling system is designed as a primary system operating periodically in a day and night cycle with the absorber (12) designed as a solar collector having a number of parallel absorber tubes (13) accommodating a humidity absorbing compound for the suction of coolant at night hours at a comparatively low temperature and delivery of coolant to the condenser (8) at day hours at a comparatively high temperature. The coolant transport to and from the absorber (12) takes place through a single tube connection (11). The humidity absorbing compound in the absorber tubes (13) is in a direct thermal contact with the evaporator tubes (15) of a secondary self-circulating coolant circuit, in which a solar energy actuated blocking valve device is connected in a supply line between a condenser (20) and the evaporator tubes (15).

4 Claims, 2 Drawing Figures

SOLAR ENERGY POWERED SYSTEM FOR THE PRODUCTION OF COLD

The invention relates to a system for the production of cold with an absorption cooling system comprising an evaporator positioned in a thermally insulated space to which evaporator a coolant is supplied in the liquid state from a condenser through a coolant vessel and from which evaporator coolant in the vapour state is sucked by an absorber which is designed as a solar collector and comprises a humidity absorbing compound for the suction of said coolant at night hours at a comparatively low temperature and delivery of said coolant in the vapour state to the condenser at day hours at a comparatively high temperature, said coolant suction and delivery to and from the absorber taking place through one and the same tube connection to the evaporator and the condenser.

The use of solar energy as an energy source has hitherto mainly been adopted for heating purposes whereby different types of solar collector systems has gained interest on an equal footing with other kinds of alternative energy sources, as far as solar collector systems are concerned particularly for the heating of water with respect to tap water in buildings as well as swimming pools and the likes. In connection with solar collector powered air condition systems it is known, however, to incorporate an air cooling into a total solution in connection with water heating by combining the solar collector system with an absorption cooling system.

Particularly in the hotter regions of the world and in places where the access to electric power and other conventional energy sources is difficult or expensive, there is a great and up till now badly fulfilled need for cooling systems for many different purposes. Thus, such demands may exist with respect to the cooling of food, pharmaceuticals and other products which do not stand storage at elevated temperature, as well as air conditioning of living rooms for living beings, including in particular residential rooms.

A solar energy powered cooling system of the kind mentioned is known in principle from DE-A No. 609,104. In this system, the humidity absorbing compound is accommodated in a tube coil in a solar collector unit arranged on the roof of the building and is connected with a condenser cooled by a cold accumulator incorporated in a separate self-circulating system so that cooled liquid is collected in the cold accumulator at night hours for cooling the condenser at day hours.

In conventional absorption cooling systems powered for instance by gas heating it is moreover known for instance from SE-A No. 88,723 and U.S. Pat. Nos. 1,955,612 and 2,130,503 to cool an absorber vessel by means of a separate self-circulating cooling system in which the circulation is interrupted at the start of the boiling period of the absorber by means of a valve which is closed at a predetermined temperature in the absorber, for instance by thermostatic control.

It is the object of the invention to provide a system for the production of cold of the kind referred to, utilizing solar energy as the only energy source so that no demands are put on access to electricity and gas or other conventional forms of energy supply, whereby a very high efficiency and thus a high cooling capacity relative to the solar collector efficiency may be obtained with a very simple design.

According to the invention, a system for the production of cold of the kind referred to is characterized in that the absorber comprises a number of parallel absorber tubes which are connected with said tube connection through a manifold, and each of which comprises said humidity absorbing compound in a direct thermal contact with parallel evaporator tubes of a secondary self-circulating cooling circuit positioned coaxially in said absorber tubes, a solar energy actuated blocking valve device being arranged in a coolant supply tube between a condenser and said evaporator tubes in said secondary cooling circuit.

Since the daily temperature variation i.e. the temperature difference between day and night hours may be utilized to energize a periodically operating absorption cooling system, the process in the system is conducted in the way that evaporation of coolant in the thermally insulated space takes place at night hours during which the absorber is not exposed to solar energy. By providing in this period an intensified direct cooling of the absorber tubes by means of the secondary self-circulating cooling circuit the humidity absorbing compound which may be of a known type such as calcium chlorid can be brought onto a temperature at which it will effectively absorb coolant in the vapour state from the evaporator. Duting the cooling period in which the solar energy actuated blocking valve device is open for circulation of coolant in the secondary circuit substantially the entire quantity of coolant in the system will be absorbed in the compound in the absorber tubes.

At the beginning of day hours the influence of solar heating will rapidly act on the solar energy actuated blocking valve device for interrupting the coolant circulation in the seconday circuit and, on the other hand, bring the compound in the absorber tubes in the absorber designed as a solar collector onto a temperature at which it can no longer retain the absorbed coolant quantity, but will deliver it in the vapour state to the condenser of the system from which coolant in the liquid state is transferred to the coolant vessel. During day hours substantially the entire coolant quantity will be collected in the liquid state in the coolant vessel in which it is retained until evaporation starts again as a result of coolant absorption in the compound in the absorber tubes, since the vapour pressure in the tube connection between the coolant vessel and the absorber prevents evaporation in the former period.

As a result of the fact that transportation of coolant to and from the coolant vessel takes place in separate periods, only one tube connection is required from the absorber through the condenser to the coolant vessel, so that the system according to the invention is simple in design.

Since the cooling of the compound in the absorber tube by means of the secondary cooling circuit is of essential importance to the efficiency of the process it is an essential characteristic of the invention that a good direct thermal contact exists between the compound and the evaporator tubes of the secondary cooling circuit.

To obtain such a good thermal contact and in addition an optimal even distribution of the humidity absorbing compound over the cross section of the absorber tubes a preferred embodiment of the system according to the invention is further characterized in that the evaporator tubes of the secondary cooling circuit are each enclosed by a heat-conducting finned tube with external longitudinal fins for dividing the space of annular cross section between the finned tube and the external wall of the absorber tube in a number of chambers for accommodating said humidity absorbing compound.

The absorber comprising the compound accommodated in absorber tubes may be designed as a conventional solar collector. To ensure a high efficiency with respect to the elevated temperature necessary for the delivery of coolant in the vapour state from the humidity absorbing compound to the condenser in day hours it may be expedient, especially in case of a large absorber area with comparatively long absorber tubes, to increase the solar energy collection capacity of the absorber tubes by providing tangential flat fins on the external side of the absorber tubes.

The solar energy actuated blocking valve device between the evaporator and the condenser of the secondary cooling circuit may in a simple way be constituted by a so-called bubble pump which in principle functions in the same manner as a water closure, and is exposed at the outlet side to coolant in the vapour state in the evaporator tubes of the secondary circuit which by the temperature to which the bubble pump is exposed under the influence of the solar energy in day hours gives rise to a bubble generation effective to block for the flow of coolant in the liquid state from the condenser to the evaporator tubes.

In the following the invention will be explained in further details with reference to the drawing in which FIG. 1 shows a schematic diagram of an embodiment of a cold production system according to the invention, and FIG. 2 a cross sectional view of an absorber tube in the absorber cooled periodically by a secondary coolant circuit.

In the embodiment shown in FIG. 1 of a system according to the invention the coolant evaporator 1 is positioned in a thermally insulated space 2 for which cooling is desired. The space 2 may constitute for example a cooling box for food, pharmaceuticals or other products for which cold storage is desired, whereby in consideration of the periodical operation of the system to be explained in the following a cold reservoir 3 may be provided in the space 2 to maintain a low temperature in the period in which no evaporation of coolant takes place. However, the space or container 2 may also constitute for instance a cooling or freezing space for the production of ice blocks or a cooling chamber for an air conditioning system.

By means of an inlet line 4 for coolant in the liquid state the evaporator 1 is connected with a coolant vessel 5 having a capacity exceeding the total coolant quantity of the system. In addition the evaporator 1 is connected through an outlet line 6 for coolant in the vapour state to the vessel 5 at a higher level than the liquid level when the total coolant quantity of the system is collected in the vessel 5.

An inlet tube 7 for coolant in the liquid state to the vessel 5 constitutes the lowermost part of a single tube connection between the vessel 5 and the absorber of the system, since the inlet tube 7 is connected to the bottom of a condenser 8 having a water reservoir 9 through which the single tube connection extends as a tube coil 10. The part of the tube connection positioned at a higher level is constituted by a tube part 11 between the condenser 8 and the absorber 12.

The absorber 12 is designed as a solar collector and comprises a number of parallel absorber tubes 13 which are connected to the tube 11 through a manifold 14 at the upper end of the absorber 12 which in this case is shown to be inclined for the arrangement against an inclined roof face.

The individual absorber tubes 13 are filled with a humidity absorbing compound, such as calcium chloride. A secondary cooling circuit comprises an evaporator having in each of the upper tubes 13 a coaxially extending evaporator tube 15, said evaporator tube being connected through a manifold 16 at the lower end of the absorber 12 with an inlet tube 17 for coolant in the liquid state and through a manifold 18 at the upper end of the absorber 12 with an outlet line 19 for coolant in the vapour state. The inlet line 17 and the outlet line 19 are connected to a condenser 20, whereby a solar energy actuated blocking valve device 21 is connected into the inlet line 17.

The circulation of coolant in the two cooling circuits is shown by arrows of which the solid arrows 22 designate coolant in the vapour state, whereas the dashed arrows 23 designate coolant in the liquid state. The system is operating periodically in a day and night cycle, in which the evaporation of coolant in the evaporator 1 takes place at night hours when the absorber 12 is not exposed to solar radiation on one hand, and is exposed on the other hand to further cooling by means of the secondary cooling circuit including the evaporator tubes 15 extending coaxially in the absorber tubes 13. Thereby the humidity absorbing compound in the absorber tubes 13 attains a low temperature at which it has a strong absorbing effect relative to the evaporated coolant. As a result thereof the total coolant quantity in the system, which at the beginning of the evaporation period is collected in the coolant vessel 5 will be sucked into the humidity absorbing compound in the absorber tubes 13 in the course of the evaporation period, the absorber tubes 13 being proportioned to accomodate a compound quantity having an absorption capacity corresponding to the total coolant quantity.

During day hours the influence of solar radiation will cause a temperature increase in the absorber itself on one hand and act on the blocking valve device 21 very rapidly on the other hand to interrupt the coolant circulation in the secondary circuit. The blocking valve device 21 is constituted in the embodiment shown of a so-called bubble pump operating, in principle, in the same way as a water closure since it is exposed to solar radiation on the inlet side whereby vapour bubbles are generated in the liquid to force any downwards flowing liquid back into the condenser 20 by their rise Thereby, the passage of coolant from the condenser 20 to the evaporator tubes 15 will be blocked.

With the temperature increase caused thereby the humidity absorbing compound in the absorber tubes 13 can no longer retain the absorbed coolant quantity, but delivers the coolant in the vapour state at increasing temperature through the tube connection 11 to the condenser 8 from which coolant in the liquid state is supplied to the collecting vessel 5 through the tube 7.

After the end of the day hours functioning as a regeneration period the process is repeated by cooling of the absorber no longer exposed to solar radiation, and the opening of the blocking valve device 21 for circulation of coolant in the secondary circuit.

Figure 2:
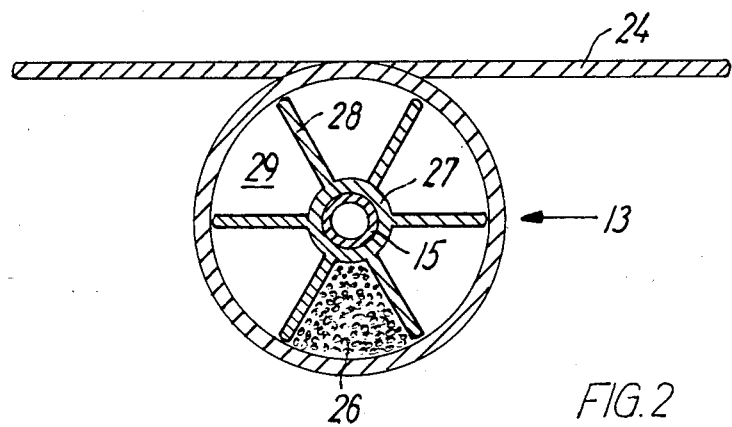

In order to obtain a high efficiency for the cooling at night hours and the temperature increase at day hours the absorber tubes may be designed as shown in FIG. 2. To increase the solar energy collection flat tangential fins 24 are attached to the external side of the tubes 13 to be positioned immediately below a covering sheet 25 of a type known per se in the absorber 12. The width of the fins 24 is adjusted according to the quantity of humidity absorbing compound 26 and the coolant quantity so that at day hours a temperature is attained by which the compound 26 delivers in the course of the period the total coolant quantity absorbed by it in the preceeding night period.

In order to ensure an even distribution of the humidity absorbing compound 26 throughout the cross section of the absorber tubes 13 as well as a good thermal contact to the evaporator tubes 15 of the secondary soolant circuit extending coaxially in the absorber tubes 13 the evaporator tubes 15 are surrounded by a heat conducting finned tube 27 having a number of longitudinal fins 28 dividing the space of annular cross section between the tube 27 and the external wall of the absorber tubes 13 in a number of chambers 29 accommodating each its share of the total quantity of humidity absorbing compound of the absorber tube 13.

The coolant in the primary cooling circuit is preferably ammonium, but it may be any coolant suitable for absorption cooling systems. In the secondary circuit a hydrocarbon based coolant may be used such as one of the so-called chloro-fluoro-carbons.

The efficiency of the system will be determined by the efficiency of the absorber designed as a solar collector defined by the product of the solar collector efficiency, the absorber area, the incoming solar radiation and the number of sun hours on one hand and the coolant absorption in the humidity absorbing compound defined by the product of the specific heat of reaction of the compound and the quantity of absorbed coolant per unit of length of the absorber tubes.

We claim:

1. A system for the production of cold with an absorption cooling system comprising an evaporator (1) positioned in a thermally insulated space (2) to which evaporator a coolant is supplied in the liquid state from a condenser (8) through a coolant vessel (5) and from which evaporator coolant in the vapour state is sucked by an absorber (12) which is designed as a solar collector and comprises a humidity absorbing compound for the suction of said coolant at night hours of a comparatively low temperature and delivery of said coolant in the vapour state to the condenser (8) at day hours at a comparatively high temperature, said coolant suction and delivery to and from the absorber taking place through one and the same tube connection (11) to the evaporator (1) and the condenser (8), characterized in that the absorber (12) comprises a number of parallel absorber tubes (13) which are connected with said tube connection (11) through a manifold (14), and each of which comprises said humidity absorbing compound in a direct thermal contact with parallel evaporator tubes (15) of a secondary self-circulating cooling circuit positioned coaxially in said absorber tube (13), a solar energy actuated blocking valve device (21) being arranged in a coolant supply tube (17) between a condenser (20) and said evaporator tubes (15) in said secondary cooling circuit.

2. A system as claimed in claim 1, characterized in that the evaporator tubes (15) of the secondary cooling circuit are each enclosed by a heat-conducting finned tube (27) with external longitudinal fins (28) for dividing the space of annular cross section between the finned tube (27) and the external wall of the absorber tube (13) in a number of chambers (29) for accommodating said humidity absorbing compound (26).

3. A system as claimed in claim 1, characterized in that tangential flat fins (24) are provided on the external side of said absorber tubes (13) to increase the solar energy collecting capacity thereof.

4. A system as claimed in claim 1, characterized in that said solar energy actuated blocking valve device (21) is constituted by a bubble pump.

* * * * *

UNITED STATES PATENT AND TRADEMARK OFFICE
CERTIFICATE OF CORRECTION

PATENT NO. : 4,586,345
DATED : May 6, 1986
INVENTOR(S) : Friberg et al.

It is certified that error appears in the above-identified patent and that said Letters Patent is hereby corrected as shown below:

Col. 5, line 14, change "soolant" to -- coolant --.

Signed and Sealed this

Second Day of September 1986

[SEAL]

Attest:

Attesting Officer

DONALD J. QUIGG

Commissioner of Patents and Trademarks